United States Patent
Mukherjee et al.

(10) Patent No.: US 9,781,036 B2
(45) Date of Patent: Oct. 3, 2017

(54) EMULATING END-HOST MODE FORWARDING BEHAVIOR

(71) Applicant: LENOVO Enterprise Solutions (Singapore) PTE. LTD., New Tech Park (SG)

(72) Inventors: Nilanjan Mukherjee, San Jose, CA (US); Claude Basso, Nice (FR)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 222 days.

(21) Appl. No.: 14/811,734

(22) Filed: Jul. 28, 2015

(65) Prior Publication Data

US 2017/0034056 A1 Feb. 2, 2017

(51) Int. Cl.
| | |
|---|---|
| *H04L 12/741* | (2013.01) |
| *H04L 12/755* | (2013.01) |
| *H04L 12/713* | (2013.01) |
| *H04L 12/947* | (2013.01) |

(52) U.S. Cl.
CPC .......... *H04L 45/745* (2013.01); *H04L 45/021* (2013.01); *H04L 45/586* (2013.01); *H04L 49/25* (2013.01)

(58) Field of Classification Search
CPC ...... H04L 45/00; H04L 49/351; H04L 49/602
See application file for complete search history.

(56) References Cited

U.S. PATENT DOCUMENTS 9,294,396 B2* 3/2016 Sundaram ............. H04L 45/302

OTHER PUBLICATIONS 802.1D, IEEE Standard for Local and Metropolitan Area Networks: Media Access Control (MAC) Bridges, IEEE Computer Society, IEEE802.1D-2004, Jun. 9, 2004.
802.1Q, IEEE Standard for Local and Metropolitan Area Networks: Bridges and Bridged Networks, IEEE Computer Society, IEEE802.1Q-2014, Nov. 3, 2014.

* cited by examiner

*Primary Examiner* — Chandrahas Patel
(74) *Attorney, Agent, or Firm* — Kunzler Law Group; Jason Friday (57) ABSTRACT

Apparatuses, methods, program products, and systems for emulating end-host forwarding behavior is disclosed. A data module receives a data packet at an ingress port of a network switch. The data packet includes a source address and a destination address. The network switch includes ports designated as uplink ports and different ports designated as server ports. An update module creates an entry in the forwarding database based on the data packet. The entry for the data packet includes the source address and either an undefined server port and an undefined uplink port in response to the ingress port being an uplink port where an undefined port includes an identifier for a port that does not exist, or the ingress port and one of the one or more uplink ports in response to the ingress port being a server port. A transmission module forwards the packet to a destination address.

20 Claims, 5 Drawing Sheets

EMULATING END-HOST MODE FORWARDING BEHAVIOR

BACKGROUND

Field

The subject matter disclosed herein relates to computer networking and more particularly relates to emulating end-host mode forwarding behavior in a computer network.

Description of the Related Art

A data center rack may include a number of separate components, such as servers, switches, rack management software, and other networking devices and/or software applications. In general, server administrators typically manage and configure server systems and applications while network administrators configure networking devices within the rack, such as network switches. Some data center racks, however, may be configured as a single integrated rack that includes components like servers, applications, management software, switches, and/or other networking devices in a single rack appliance.

The integration of the network switch, and other networking devices, in a single rack appliance with the servers and management software can create a management conflict between server administrators and network administrators because server administrators may not be responsible for configuring networking devices and network administrators may not be responsible for configuring server systems. Simplifying the complexity of the networking configuration can allow server administrators to manage an integrated rack appliance without involving network administrators.

BRIEF SUMMARY

An apparatus for emulating end-host forwarding behavior is disclosed. A method and computer program product also perform the functions of the apparatus. In one embodiment, an apparatus includes a data module that receives a data packet at an ingress port of a network switch. In some embodiments, the data packet includes a source address and a destination address. In a further embodiment, the network switch includes one or more ports designated as uplink ports and one or more different ports designated as server ports.

In one embodiment, the apparatus includes an update module that, in response to a forwarding database of the network switch not comprising an entry that corresponds to the source address, creates an entry in the forwarding database based on the data packet. An entry in the forwarding database may include at least an address, a server port, and an uplink port. In certain embodiments, the entry for the data packet includes the source address and either an undefined server port and an undefined uplink port in response to the ingress port being an uplink port where an undefined port includes an identifier for a port that does not exist, or the ingress port and one of the one or more uplink ports in response to the ingress port being a server port.

In one embodiment, the apparatus includes a transmission module that forwards the data packet from the network switch to the destination address using one or more of a server port and an uplink port in response to checking the forwarding database for an entry that corresponds to the destination address.

In one embodiment, the transmission module forwards the data packet from the network switch to the destination address using an uplink port associated with the source address in response to the forwarding database including an entry for the destination address that includes an undefined server port. In some embodiments, the transmission module drops the data packet in response to the forwarding database including an entry for the destination address that includes an undefined uplink port.

In one embodiment, the transmission module forwards the data packet from the network switch to the destination address using a server port associated with the destination address in response to the forwarding database including an entry for the destination address that includes a defined server port. In some embodiments, the transmission module performs a reverse path forwarding ("RPF") check in response to the ingress port being the same as the uplink port associated with the destination address. In one embodiment, the transmission module forwards the data packet from the network switch using each server port and one or more defined uplink ports associated with the source address in response the forwarding database not including an entry for the destination address.

In a further embodiment, the apparatus includes a priority module that assigns each of the one or more designated server ports and each of the one or more designated uplink ports a priority value. In some embodiments, a server port has a higher priority value than an uplink port. In another embodiment, the priority module, in response to the forwarding database including an entry that corresponds to the source address, assigns the ingress port to the server port entry for the source address in response to determining the priority value of the ingress port is higher than the priority value of the server port for the source address in the forwarding database.

In one embodiment, the priority module, in response to determining the priority value of the ingress port is not higher than the priority value of the server port for the source address in the forwarding database, assigns the ingress port to the server port entry for the source address in response to a priority override bit for the source address being equal to zero. In some embodiments, the priority module increments the priority override bit for a source address in the forwarding database each time a data packet is received from the source address. In a further embodiment, the priority module decrements the priority override bit for a source address in the forwarding database in response to expiration of a priority override timer.

In one embodiment, the network switch is one component of an integrated data infrastructure unit that includes one or more servers, one or more network switches, management software, and application software. In some embodiments, the data packet comprises one of a unicast packet, a broadcast packet, and a multicast packet.

In one embodiment, a method includes receiving, by use of a processor, a data packet at an ingress port of a network switch. In some embodiments, the data packet includes a source address and a destination address. In a further embodiment, the network switch includes one or more ports designated as uplink ports and one or more different ports designated as server ports.

In one embodiment, the method includes creating, in response to a forwarding database of the network switch not comprising an entry that corresponds to the source address, an entry in the forwarding database based on the data packet. An entry in the forwarding database may include at least an address, a server port, and an uplink port. In certain embodiments, the entry for the data packet includes the source address and either an undefined server port and an undefined uplink port in response to the ingress port being an uplink port where an undefined port includes an identifier for a port that does not exist, or the ingress port and one of the one or more uplink ports in response to the ingress port being a server port.

In one embodiment, the method includes forwarding the data packet from the network switch to the destination address using one or more of a server port and an uplink port in response to checking the forwarding database for an entry that corresponds to the destination address.

In one embodiment, the method further includes forwarding the data packet from the network switch to the destination address using an uplink port associated with the source address in response to the forwarding database including an entry for the destination address that includes an undefined server port. In certain embodiments, the method includes dropping the data packet in response to the forwarding database including an entry for the destination address that includes an undefined uplink port.

In one embodiment, the method includes forwarding the data packet from the network switch to the destination address using a server port associated with the destination address in response to the forwarding database including an entry for the destination address that includes a defined server port. In some embodiments, the method includes performing a reverse path forwarding ("RPF") check in response to the ingress port being the same as the uplink port associated with the destination address. In certain embodiments, the method includes forwarding the data packet from the network switch using each server port and one or more defined uplink ports associated with the source address in response the forwarding database not including an entry for the destination address.

In one embodiment, a program product includes a computer readable storage medium that stores code executable by a processor. In certain embodiments, the executable code includes code to perform receiving a data packet at an ingress port of a network switch. In some embodiments, the data packet includes a source address and a destination address. In a further embodiment, the network switch includes one or more ports designated as uplink ports and one or more different ports designated as server ports.

In one embodiment, the executable code includes code to perform creating, in response to a forwarding database of the network switch not comprising an entry that corresponds to the source address, an entry in the forwarding database based on the data packet. An entry in the forwarding database may include at least an address, a server port, and an uplink port. In certain embodiments, the entry for the data packet includes the source address and either an undefined server port and an undefined uplink port in response to the ingress port being an uplink port where an undefined port includes an identifier for a port that does not exist, or the ingress port and one of the one or more uplink ports in response to the ingress port being a server port.

In one embodiment, the executable code includes code to perform forwarding the data packet from the network switch to the destination address using one or more of a server port and an uplink port in response to checking the forwarding database for an entry that corresponds to the destination address.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
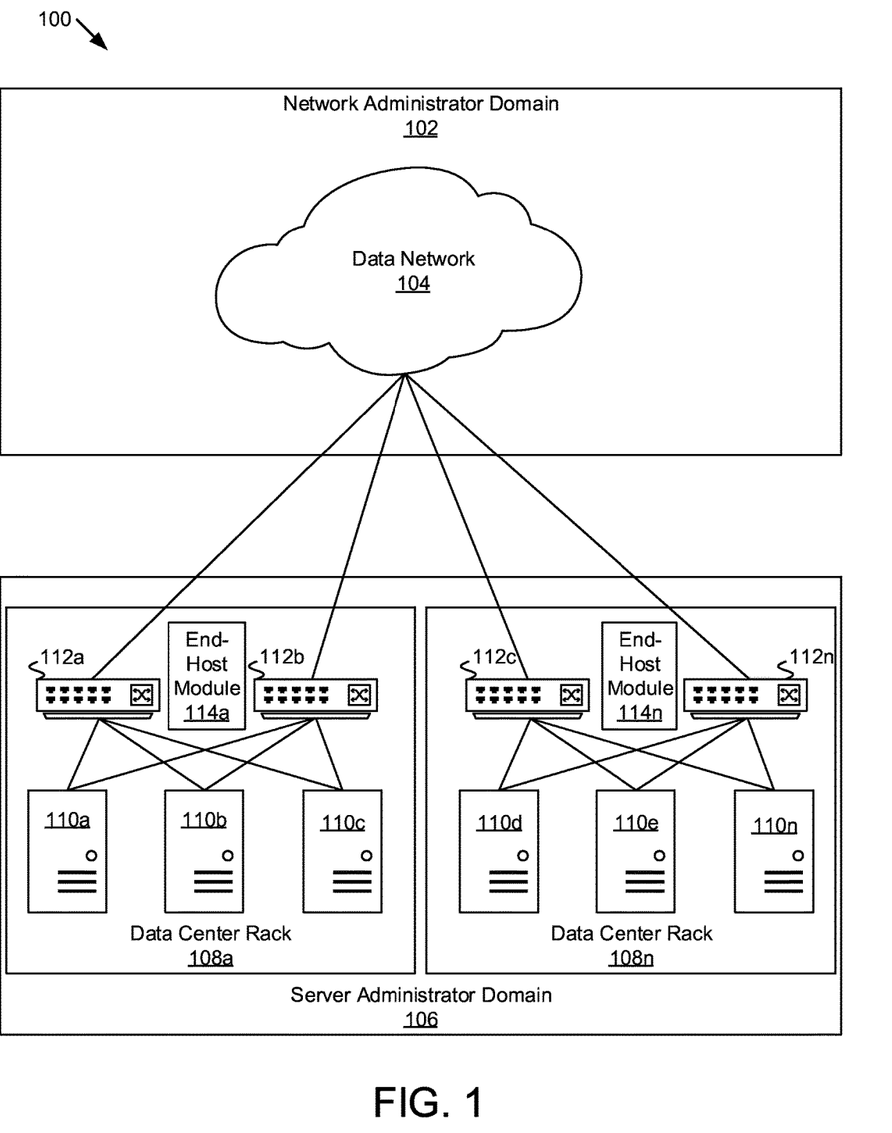
FIG. 1 is a schematic block diagram illustrating one embodiment of a system for emulating end-host mode forwarding behavior.

FIG. 1 illustrates one embodiment of a system 100 for emulating end-host mode forwarding behavior. In one embodiment, the system 100 includes a network administrator domain 102. The network administrator domain 102, as used herein, comprises the portion of system 100 that falls under the management of a network administrator. The network administrator is typically responsible for the configuration, management, and maintenance of networking devices, such as network switches 112a-n, hubs, routers, bridges, etc., both within the data center and as part of the data network 104.

In one embodiment, the system 100 includes a data network 104 as part of the network administrator domain 102. The data network 104, in some embodiments, is the backbone network for a data center, meaning that the data network 104 is a network that interconnects various pieces of a larger computer network and may provide a path for the exchange of information between different LANs or subnetworks.

In one embodiment, the data network 104 is a digital communication network that transmits digital communications. The data network 104 may include a wireless network, such as a wireless cellular network, a local wireless network, such as a Wi-Fi® network, a Bluetooth® network, a near-field communication ("NFC") network, an ad hoc network, and/or the like. The data network 104 may include a wide area network ("WAN"), a storage area network ("SAN"), a local area network ("LAN"), an optical fiber network, the internet, or other digital communication network. The data network 104 may include two or more networks. The data network 104 may include one or more servers, routers, switches, and/or other networking equipment. The data network 104 may also include computer readable storage media, such as a hard disk drive, an optical drive, non-volatile memory, random access memory ("RAM"), or the like.

In one embodiment, the system 100 includes a server administrator domain 106. The network administrator domain 102, as used herein, comprises the portion of system 100 that falls under the management of a server administrator. The server administrator is typically responsible for the configuration, management, and maintenance of server devices, including physical and virtual servers 110a-n, server management applications, other software applications executing on the servers 110a-n, etc.

Traditionally, the components of the network administrator domain 102, e.g., network switches 112a-n, routers, hubs, etc., were independent and distinct from the components of the server administrator domain 106, e.g., servers 110a-n, application software, etc. Accordingly, the roles of the network administrator and the server administrator did not overlap. However, as depicted in FIG. 1, data centers may include integrated infrastructures with network capabilities where various data center components are included in a single rack unit or appliance.

A data center rack 108a-n, for example, may include one or more servers 110a-n, one or more network switches 112a-n, management software, application software, and/or the like. The one or more servers 110a-n, in certain embodiments, include rack servers, blade servers, desktop computers, laptop computers, virtual servers, email servers, game servers, file servers, media servers, data servers, cloud servers, or the like. The one or more network switches 112a-n, in one embodiment, are traditional network switches 112a-n that connect devices together on a computer network. The network switches 112a-n, in some embodiments, use packet switching and media access control ("MAC") address learning to receive, process, and forward data to a destination device.

Accordingly, such an integrated infrastructure blends the roles and responsibilities of the network administrator 102 and the server administrator 106 because the integrated data center racks 108a-n includes components that fall under the responsibility of the network administrator 102 and components that fall under the responsibility of the server administrator 106. Server administrators 106 typically do not or cannot manage configuration of networking components, such as network switches 112a-n, and network administrators 102 may not prefer the networking components within the integrated data center rack 108a-n, or may not trust the server administrator 106 to configure the networking components correctly.

To resolve the contention between network administrators 102 and server administrators 106 created by using integrated data center racks 108a-n, the subject matter disclosed herein describes emulating end-host behavior in the network switches 112a-n in the data center racks 108a-n instead of a switch 112a-n presenting itself as a full-featured switch 112a-n to the upstream data network 104. As used herein, in end-host mode, the switches 112a-n still provide switching functionality between the servers 110a-n within the data center rack 108a-n (as defined in the IEEE 802.1D specification) while at the same time creating end-host abstraction to devices in the upstream data network 104 so that it appears to the upstream devices, such as aggregation switches, network switches, etc. that fall under the responsibility of the network administrator 102, that they are directly connected to a server 110a-n. In this manner, the complexity of configuring and maintaining the network switches 112a-n can be abstracted away so that server administrators 106 can maintain the data center racks 108a-n without providing complex networking support and network administrators 102 do not need to worry about which network switches 112a-n are being used, how the network switches 112a-n are being configured, or the like. This maintains the distinct separation of roles between server administrators 106 and network administrators 102.

In one embodiment, the data center racks 108a-n also include an end-host module 114a-n. The end-host module 114a-n, in certain embodiments, is configured to emulate end-host behavior in a network switch 112a-n. In one embodiment, the end-host module 114a-n is configured to receive a data packet at an ingress packet of a switch 112a-n, which may include ports that have been designated as either server ports or uplink ports. The end-host module 114a-n determines whether a source address of the data packet is in a forwarding database on the switch 112a-n and forwards the data packet to a destination using a server port and/or an uplink port based on the determination of whether the forwarding database has an entry for the data packet and, if so, based on the information in the forwarding database. The end-host module 114a-n will be discussed in more detail below with reference to FIG. 2.

Figure 2:
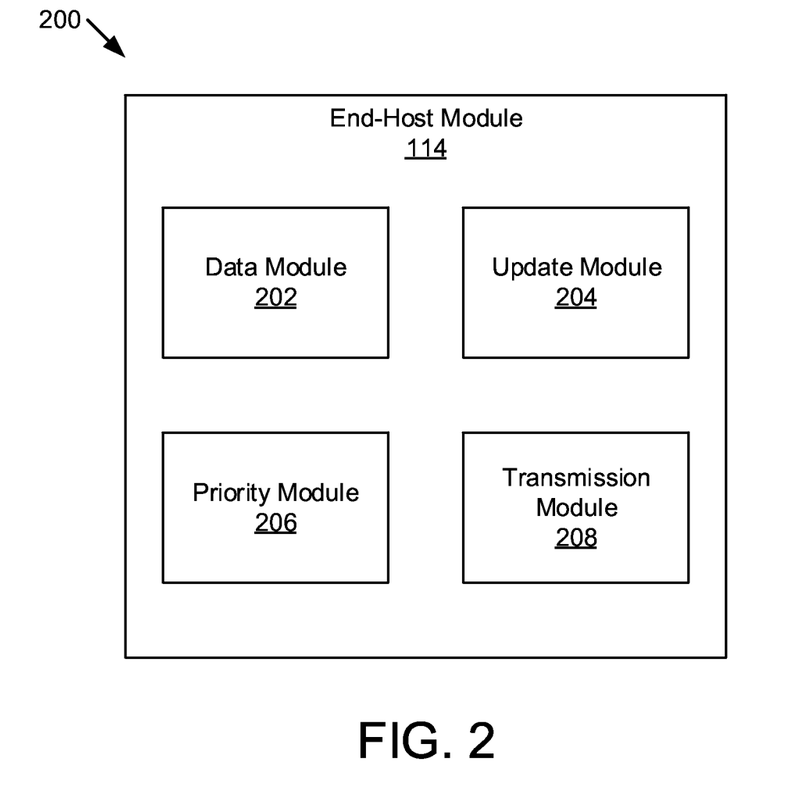
FIG. 2 is a schematic block diagram illustrating one embodiment of a module for emulating end-host mode forwarding behavior.

FIG. 2 illustrates one embodiment of a module 200 for emulating end-host mode forwarding behavior. In one embodiment, the module 200 includes one embodiment of an end-host module 114. The end-host module 114, in certain embodiments, includes one or more of a data module 202, an update module 204, a priority module 206, and a transmission module 208, which are described in more detail below.

The data module 202, in one embodiment, is configured to receive a data packet at an ingress port of a network switch 112a-n. In one embodiment, the data packet may include an IP packet, a TCP packet, a UDP packet, an ICMP packet, or the like. In certain embodiments, the data packet may include a source address that identifies the transmitter of the packet and a destination address that identifies the receiver of the packet. The source and/or destination address may be a MAC address, an IP address, or other indicator that identifies a device on the network for the sender and/or receiver. In certain embodiments, the data packet may include a unicast data packet, a broadcast data packet, a multicast data packet, or the like.

In one embodiment, the data module 202 receives the data packet at an ingress port of the network switch 112a-n that has been designated as a server port or an uplink port. As used herein, server ports are ports of the network switch 112a-n that are connected to a server 110a-n of the data center rack 108a-n. Uplink ports, as used herein, are ports of the network switch 112a-n that are connected to devices on the upstream data network 104. In some embodiments, the data module 202 receives a data packet on a port designated as either a server port or an uplink port. For example, the data module 202 may receive a data packet from a sender on the data network 104 at an uplink port and a data packet from a server 110a-n on a server port.

In one embodiment, the update module 204 checks a forwarding database at the network switch 112a-n where the data packet was received for an entry that corresponds to the source address, e.g., the source MAC address, of the data packet. As used herein, a forwarding database, also known as a forwarding table, forwarding information base, or CAM table, is used to determine the proper interface or port that the switch 112a-n should use to forward a data packet. A forwarding database may be dynamically populated as data packet are received and generally maps addresses, such as MAC addresses to ports.

For example, in a switch 112a-n that implements a traditional MAC learning scheme, instead of an end-host MAC learning scheme as described herein, when a packet that has a source MAC address of 11:22:33:44:55:66 is received on port 1, the forwarding database is checked to determine whether an entry exists for the source MAC address. If the entry does not exist, a new entry is created in the forwarding database that maps the source MAC address to the port that the data packet was received on:

TABLE 1

| Source MAC | Port |
|---|---|
| 11:22:33:44:55:66 | 1 |

If an entry for the source MAC address already exists in the forwarding table, the existing entry updates the port with the port that the data packet was received on if the existing port is different than the port that the data packet was received on. Unlike the traditional MAC learning scheme implemented by network switches 112a-n, the subject matter disclosed herein describes a MAC learning scheme that allows network switches 112a-n to emulate host-end mode forwarding behavior.

In the end-host MAC learning scheme disclosed herein, if the update module 204 determines that the forwarding database does not contain an entry that corresponds to the source address, the update module 204 creates a new entry in the forwarding database. In such an embodiment, each entry in the forwarding database may include at least three elements: a source address, a server port, and an uplink port. In certain embodiments, the update module 204 creates an entry in the forwarding database dependent on whether the data packet was received on a server port or an uplink port of the network switch 112a-n.

In one embodiment, if the data packet was received at an uplink port of the network switch 112a-n, the update module 204 creates a new entry in the forwarding database that includes the source address, an undefined port for the server port, and an undefined port for the uplink port. As used herein, an undefined port may be an identifier for a port that does not exist, is null, or is otherwise invalid. For example, an undefined port may be identified by a system-defined port number DPORT-NULL. The undefined port identifier will be discussed further below with reference to forwarding data packets by the transmission module 206.

Therefore, if a data packet with source MAC address 11:22:33:44:55:66 is received on an uplink port of the network switch 112a-n, and the forwarding database does not contain an entry that corresponds to the source address of the data packet, the update module 204 creates a new entry in the forwarding database:

TABLE 2

| Source MAC | Server Port | Uplink Port |
|---|---|---|
| 11:22:33:44:55:66 | DPORT-NULL | DPORT-NULL |

In one embodiment, if the data packet was received at a server port of the network switch 112a-n, and the forwarding database does not contain an entry that corresponds to the source address, the update module 204 creates a new entry in the forwarding database that includes the source address, the ingress port for the server port, and a dynamically determined uplink port that is currently available. For example, if the update module 204 determines that uplink port 4 is available, the update module 204 may create a new entry in the forwarding database for a data packet that is received at server port 2 from source MAC address aa:bb:cc:dd:ee:ff:

TABLE 3

| MAC | Server Port | Uplink Port |
|---|---|---|
| aa:bb:cc:dd:ee:ff | 2 | 4 |

In some embodiments, the update module 204 dynamically determines an available uplink port based on a hash function, a software-determined scheme, according to a linear, random, or round robin order, or the like. In one embodiment, if the update module 204 determines that the forwarding database contains an entry that corresponds to the source address of the data packet, the update module 204 determines whether to update the server port for the existing entry based on a priority value associated with the existing port. Optionally, the apparatus 200 includes a priority module 206 that assigns each server port and each uplink port of a network switch 112a-n a priority value. As used herein, a priority value for a port indicates a ranking, an importance, a weight, or the like, for the port and may be compared to priority values of other ports. Accordingly, the update module 204 and/or the priority module 206 may determine whether to update an entry in the forwarding database corresponding to the source address of the data packet received on an ingress port based on whether the data packet was received on an ingress port that has a higher priority value than the priority value of the existing entry in the forwarding database.

In certain embodiments, server ports have higher priority values than uplink ports. For example, server ports may be assigned a priority value of 1 and uplink ports may be assigned a priority value of 0. Thus, continuing with the above example, if the data packet with a source address 11:22:33:44:55:66 is received on an uplink port and the data packet with a source address aa:bb:cc:dd:ee:ff is received on a server port, the entry for each source address in the forwarding database may be:

TABLE 4

| MAC | Server Port | Uplink Port | Priority |
|---|---|---|---|
| 11:22:33:44:55:66 | DPORT-NULL | DPORT-NULL | 0 |
| aa:bb:cc:dd:ee:ff | 2 | 4 | 1 |

Therefore, if a data packet was received from source address 11:22:33:44:55:66 on a server port, the priority module 206 may determine that the ingress port, e.g., the server port, which has a priority value of 1, has a greater priority value than the existing port for the entry corresponding to the source address. Accordingly, the update module 204 may update the entry in the forwarding database corresponding to the source address by assigning the new port, a new uplink port, and a new priority value to the entry for the source address in the forwarding database.

For example, if the MAC address 11:22:33:44:55:66, illustrated above, is assigned to a virtual machine that is initially located in the upstream data network 104, when a packet is received from the virtual machine on an uplink port, the update module 204 may create an entry in the forwarding database for the source address of the virtual machine, as shown above in Table 4. Subsequently, if the virtual machine is moved into the data center rack 108a-n, when a packet is received from the virtual machine on a server port, the update module 204 or the priority module 206 may determine that an entry exists in the forwarding database for the virtual machine's MAC address 11:22:33:44:55:66. The update module 204 or the priority module 206 may then check the priority bit of the entry in the forwarding database to compare the existing priority value to the priority value of the server port, and determine that the port the packet was received on, i.e., the server port, has a higher priority value than the existing priority value. Accordingly, the update module 204 may update the entry in the forwarding database corresponding to the source address by assigning the new port, a new uplink port, and a new priority value to the entry for the source address in the forwarding database. In this manner, the update module 204 can correctly update the forwarding database to reflect the new location of the virtual machine in the data center rack 108a-n by flushing the old data in the entry for the source address from the forwarding database. Furthermore, this allows the update module 204 to avoid unnecessarily updating the forwarding database if a data packet sent from a server 110a-n to the upstream data network 104 is returned and/or received from the upstream data network 104 on an uplink port.

Otherwise, if the priority module 206 determines that the value of the new port is not greater than the priority value of the port in the entry for the source address, the priority module 206 determines whether a priority override bit or flag is set to 0 in the entry for the source address in the forwarding database. As used herein, the priority override bit or flag may be an element of an entry for a source address in the forwarding database that indicates whether the port element of the entry should be overwritten, which may happen when the priority override bit is 0.

In one embodiment, when the update module 204 creates a new entry in the forwarding database for a source address, the priority module 206 or the update module 204 sets the priority override bit to an initial value, such as 2, for example. Thereafter, in certain embodiments, when a data packet is received from the same source address on the same port, the update module 204 or the priority module 206 increments the priority override bit, by a value of 2, for example. The update module 204 or the priority module 206 may increment the priority override bit up to a predetermined maximum value, which may be defined as MAX_PRI_OVERRIDE_VAL. The MAX_PRI_OVERRIDE_VAL may be at least 2.

In one embodiment, the update module 204 or priority module 206 decrements the priority override bit in response to the expiration of a priority override timer or after a predetermined priority time interval, until the priority override bit is 0. For example, the update module 204 or the priority module 206 may decrement the priority override bit after 10 seconds, 5 seconds, 1 second, 500 milliseconds, 100 milliseconds, etc. In some embodiments, the time interval is less than an "fdb-timeout" interval generally used in traditional network switches. The time interval may be system-defined or configured by a user. Therefore, as an example, if a data packet is received with source address 11:22:33:44:55:66 on server port 2, the entry in the forwarding table may be:

TABLE 5

| MAC | Server Port | Uplink Port | Priority | Override Bit |
|---|---|---|---|---|
| 11:22:33:44:55:66 | 2 | 4 | 1 | 2 |

If, before expiration of the timer interval, another data packet is received on server port 2 from source address 11:22:33:44:55:66, the update module 204 or priority module 206 may increment the priority override bit by 2:

TABLE 6

| MAC | Server Port | Uplink Port | Priority | Override Bit |
|---|---|---|---|---|
| 11:22:33:44:55:66 | 2 | 4 | 1 | 4 |

If the predetermined priority time interval is set to 5 seconds and a data packet from the source address is not received during the time interval, the update module 204 or priority module 206 decrements the priority bit after expiration of the predetermined time interval. Therefore, if a data packet from the source address is not received within 20 seconds, the priority bit will be decremented to 0:

TABLE 7

| MAC | Server Port | Uplink Port | Priority | Override Bit |
|---|---|---|---|---|
| 11:22:33:44:55:66 | 2 | 4 | 1 | 0 |

Consequently, in one embodiment, when the priority override bit is set to 0, if a data packet is received from the source address on a different port than the port in the forwarding database, the update module 204 assigns the new port to the entry for the source address in the forwarding database, even if the new port has a lower priority value than the existing port. Use of the priority bit and the priority override bit in this manner ensures that entries in the forwarding database are kept current and do not become stale.

For example, if the MAC address 11:22:33:44:55:66, illustrated above, is assigned to a virtual machine that is initially located in the data center rack 108a-n, when a packet is received from the virtual machine on a server port, the update module 204 may create an entry in the forwarding database for the source address of the virtual machine, as shown above in Table 5. Subsequently, if the virtual machine is moved from the data center rack 108a-n to the upstream data network 104, when a packet is received from the virtual machine on an uplink port, the update module 204 or the priority module 206 may determine that an entry exists in the forwarding database for the virtual machine's MAC address 11:22:33:44:55:66. The update module 204 or the priority module 206 may then check the priority bit of the entry in the forwarding database to compare the existing priority value to the priority value of the server port, and determine that the port the packet was received on, i.e., the uplink port, does not have a higher priority value than the existing priority value. However, the priority module 206 may determine that the priority override bit is now 0, as shown in Table 7, which indicates that the existing entry should be overridden. In this manner, the update module 204 can correctly update the forwarding database to reflect the new location of the virtual machine in the upstream network by flushing the old data in the entry for the source address from the forwarding database.

In one embodiment, the apparatus 200 includes a transmission module 208 that forwards the data packet from the network switch 112a-n to the destination address, e.g., the destination MAC address, using one or more of a server port and an uplink port in response to checking the forwarding database for an entry that corresponds to the destination address. In one embodiment, if the transmission module 208 determines that the forwarding database includes an entry that corresponds to the destination address, and the entry has a defined or valid server port (e.g., the server port is not DPORT-NULL), the transmission module 208 forwards the data packet to the server port. For example, given the portion of the forwarding table below with reference to Table 8, if the destination address of a received data packet is aa:bb:cc:dd:ee:ff, the transmission module 208 may forward the data packet to the destination address using server port 2.

TABLE 8

| MAC | Server Port | Uplink Port | Priority | Override Bit |
|---|---|---|---|---|
| 11:22:33:44:55:66 | DPORT-NULL | DPORT-NULL | 0 | 2 |
| aa:bb:cc:dd:ee:ff | 2 | 4 | 1 | 4 |
| 11:aa:22:bb:33:cc | DPORT-NULL | DPORT-NULL | 0 | 2 |

In some embodiments, if the ingress port that the packet was received on is an uplink port, the transmission module 208 performs a reverse path forwarding ("RPF") check. As used herein, an RPF check determines whether the ingress port that the data packet was received on is the same as the uplink port for the destination address to prevent packet looping, spoofing, or other security issues in the network. For example, if the received data packet was received on uplink port 4, which corresponds to the uplink port for the destination address in the forwarding table, then the transmission module 208 may forward the data packet to the destination address because the RPF check confirms that the data packet was received on an expected uplink port for the particular destination address. Otherwise, if the RPF check determines that the uplink port the data packet was received on does not match the uplink port in the forwarding database for the destination address, the transmission module 208 may drop the data packet and not forward it to the destination address.

In a further embodiment, if the transmission module 208 determines that the forwarding database includes an entry that corresponds to the destination address, and the entry has an undefined or invalid server port (e.g., the server port is DPORT-NULL), the transmission module 208 forwards the data packet to the uplink port associated with the source address of the received data packet. For example, referring to Table 8 above, if a data packet is received from source address aa:bb:cc:dd:ee:ff on server port 2 and intended for destination address 11:22:33:44:55:66, the transmission module 208 may forward the data packet to the destination 11:22:33:44:55:66 using uplink port 4, which is associated with the source address aa:bb:cc:dd:ee:ff, because the server port for the destination address 11:22:33:44:55:66 in the forwarding database is undefined, as indicated by DPORT-NULL. In other words, the transmission module 208, in some embodiments, forwards the data packet to a destination address using an uplink port associated with the source address of the data packet if the destination address is located on the upstream data network 104.

In such an embodiment, if the uplink port of the source address is also undefined (e.g., set to DPORT-NULL), the transmission module 208 may drop the data packet. In some embodiments, this ensures that the data packets received on uplink ports from the upstream data network 104 and intended for destinations on the upstream data network 104, as indicated by DPORT-NULL in the forwarding database, are not resent to the upstream data network 104 to prevent looping of data packets.

In one embodiment, if the transmission module 208 determines that the forwarding table does not include an entry that corresponds to a destination address of the received data packet, which may include an unknown unicast data packet, a broadcast data packet, a multicast data packet, or the like, the transmission module 208 forwards the data packet to all server ports and the uplink ports associated with the source address of the data packet. For example, referring again to Table 8, if a unicast data packet is received on server port 2 from source address aa:bb:cc:dd:ee:ff and intended for destination address 12:34:56:78:90:ab, the transmission module 208 may forward the data packet on all server ports (except for the server port where the data packet was received) and uplink port 4 associated with the source address in the forwarding table because the intended destination address 12:34:56:78:90:ab is not in the forwarding database.

Similarly, the transmission module 208 may forward broadcast and multicast data packets to server ports and an uplink port associated with the source of the data packet (if the data packet did not originate in the upstream data network 104) because there is no intended destination address associated with broadcast or multicast packets, and, therefore, will not be found in the forwarding database. Note that, in one embodiment, if an unknown unicast packet, a broadcast packet, or a multicast packet is received on an uplink port, the data packet will only be forwarded to server ports to ensure that packets that originated in the upstream data network 104 are not forwarded back to the upstream data network 104.

In one embodiment, if the servers 110*a-n*, or virtual machines running on the servers 110*a-n*, are organized into one or more virtual local area networks ("VLANs"), the transmission module 208 may perform a VLAN membership check before forwarding an unknown unicast, broadcast, or multicast data packet on a server port. For example, if servers 1 and 3 are on VLAN A and servers 2 and 4 are on VLAN B, and a broadcast packet originates with server 1, the transmission module 208 will ensure that the broadcast packet is only forwarded on a server port associated with server 3 because servers 1 and 3 are on the same VLAN, which is different than the VLAN for servers 2 and 4.

In some embodiments, the transmission module 208, before forwarding a multicast data packet, determines whether one or more recipients are members of a multicast group before forwarding the multicast packet to possible recipients. For example, if servers 1 and 3 are part of a multicast group, but servers 2 and 4 are not, then the transmission module 208 may only forward a multicast packet received from server 3 to server 1 and not servers 2 and 4 because servers 2 and 4 are not members of the multicast group. In various embodiments, the transmission module 208 only forwards broadcast or multicast packets received from the upstream data network 104 if the broadcast and multicast packets are received on designated broadcast and multicast ports, respectively.

Figure 3A:
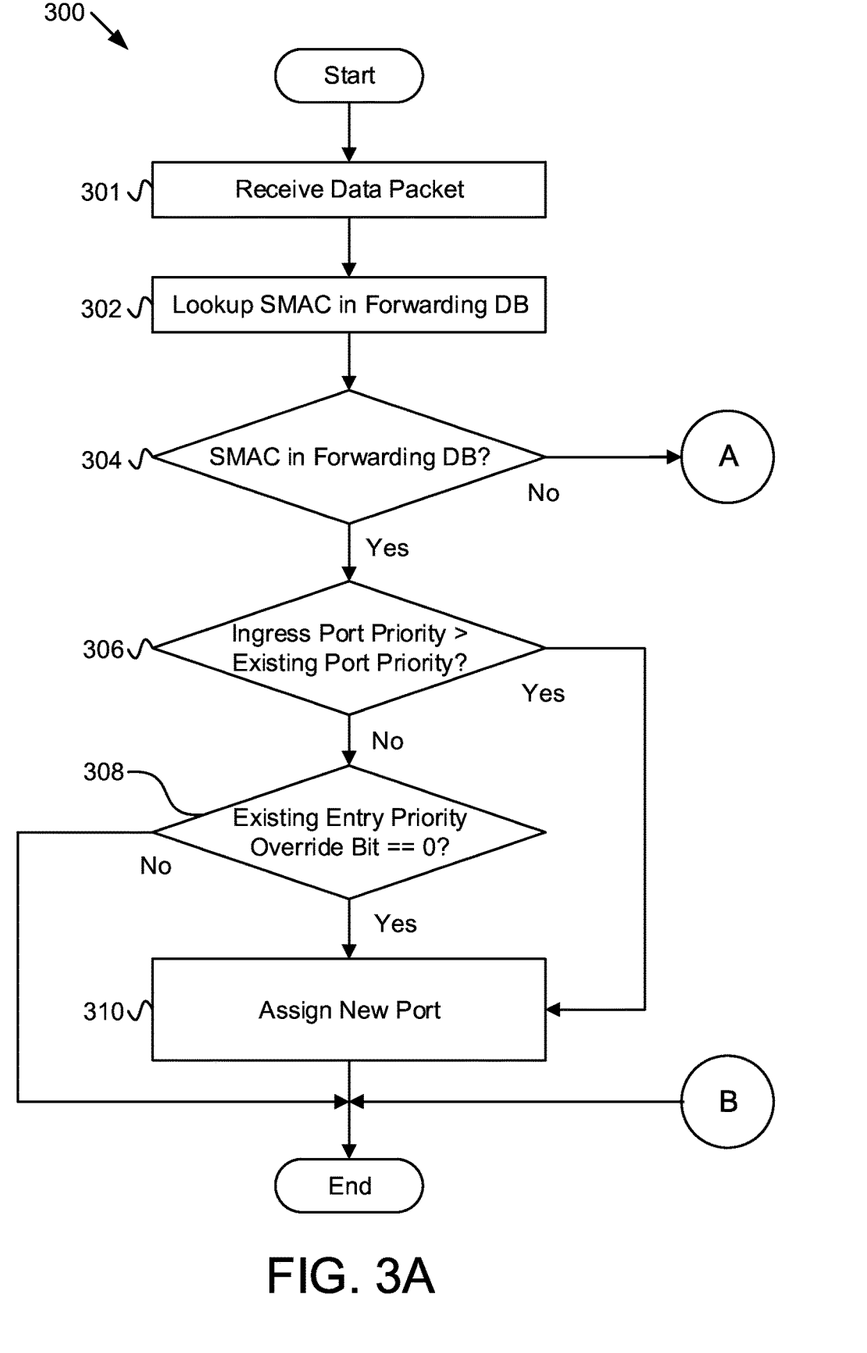
FIG. 3A is a schematic flow chart diagram illustrating one embodiment of a first part of a method for emulating end-host mode forwarding behavior.
Figure 3B:
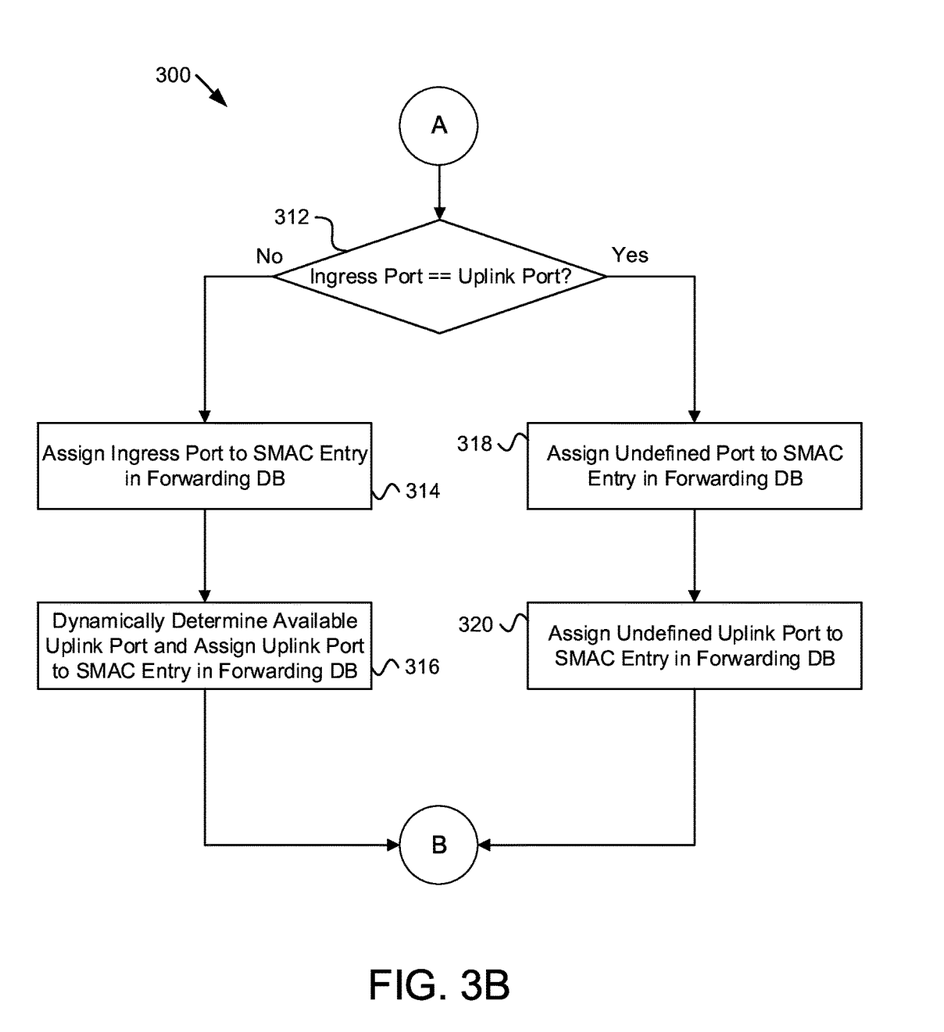
FIG. 3B is a schematic flow chart diagram illustrating one embodiment of a second part of the method of FIG. 3A.

FIGS. 3A and 3B are schematic flow chart diagrams illustrating one embodiment of a method 300 for emulating end-host mode forwarding behavior. In particular, FIGS. 3A and 3B illustrate the MAC learning process for emulating end-host behavior in a network switch 112*a-n* that is not configured to execute or is not capable of executing in end-host mode. In one embodiment, the method 300 begins and receives 301 a data packet at an ingress port of a network switch 112*a-n* of a data center rack 108*a-n*. In one embodiment, the data packet includes a source address identifying the sender of the packet, and a destination address identifying the receiver of the data packet. In some embodiments, the method 300 receives 301 the data packet at a port of the network switch 112*a-n* that has been designated as a server port or an uplink port, where a server port is a port of the network switch 112*a-n* that is connected to a server 110*a-n* within the data center rack 108*a-n*, and an uplink port is a port of the network switch 112*a-n* that is connected to a device on the upstream data network 104. A server 110*a-n* may be assigned an uplink port such that network traffic sent from the server 110*a-n* and intended for a device on the upstream data network 104 is sent through the server's 110*a-n* assigned uplink port. In one embodiment, the data module 202 receives the data packet.

In one embodiment, the method 300 performs 302 a lookup for the source address, such as a source MAC ("SMAC") address, in a forwarding database of the network switch 112*a-n*. The method 300, in a further embodiment, determines 304 whether the forwarding database contains an entry for the SMAC, and if so, proceeds to FIG. 3B (following "A" on FIG. 3A to "A" on FIG. 3B), which illustrates a second part of the method 300. If the method 300 determines 304 that the forwarding database includes an entry for the SMAC, the method 300, in certain embodiments, determines 312 whether the ingress port that the data packet was received on was an uplink port. If the method 300 determines 312 that the ingress port was not an uplink port, meaning that the ingress port was a server port, the method 300 may create an entry in the forwarding database for the SMAC and assign 314 the ingress port to the server port element of the SMAC entry. Further, in some embodiments, the method 300 dynamically determines 316 an available uplink port and assigns the determined uplink port to the SMAC entry in the forwarding database.

In a further embodiment, if the method 300 determines 312 that the ingress port was an uplink port, then the method 300 may create an entry in the forwarding database for the SMAC and assign 318 an undefined port (DPORT-NULL) to the server element in the SMAC entry in the forwarding database. In certain embodiments, the method 300 also assigns 320 an undefined port (DPORT-NULL) to the uplink port element in the SMAC entry. In certain embodiments, the update module 204 determines 304 whether the forwarding database contains an entry for the SMAC, and, if not, creates the new entry in the forwarding database for the SMAC and assigns the server port and uplink port values to the entry. The method 300 returns to the first part of the method 300 in FIG. 3A (following "B" on FIG. 3B to "B" on FIG. 3A), and the method 300 ends.

Referring to FIG. 3A, in one embodiment, if the method 300 determines 304 that the forwarding database includes an entry for the SMAC of the received data packet, the method 300 determines 306 whether the priority value of the ingress port is greater than the priority value of the existing server port stored in the forwarding database for the SMAC. If the method 300 determines 306 that the ingress port does have a greater priority value than the existing server port for the SMAC entry, the method 300 assigns 310 the ingress port to the server port for the SMAC entry in the forwarding database, and the method 300 ends.

In one embodiment, if the method 300 determines 306 that the ingress port does not have a higher priority value than the existing server port in the SMAC entry, the method 300 determines 308 whether the priority override bit for the SMAC entry is 0. In certain embodiments, if the method 300 determines 308 that the priority override bit is 0, then the method 300 assigns 310 the ingress port to the server port element of the SMAC entry in the forwarding database, and the method 300 ends. In a further embodiment, if the method 300 determines 308 that the priority override bit is not 0, the method 300 ends without assigning the ingress port to the server port element of the SMAC entry in the forwarding database. In some embodiments, the priority module 206 determines 306 whether the priority value of the ingress port is greater than the priority value of the existing server port of the SMAC entry, determines 308 whether the priority override bit for the SMAC entry is equal to 0, and assigns 310 the ingress port to the server port element of the SMAC entry in the forwarding database.

Figure 4:
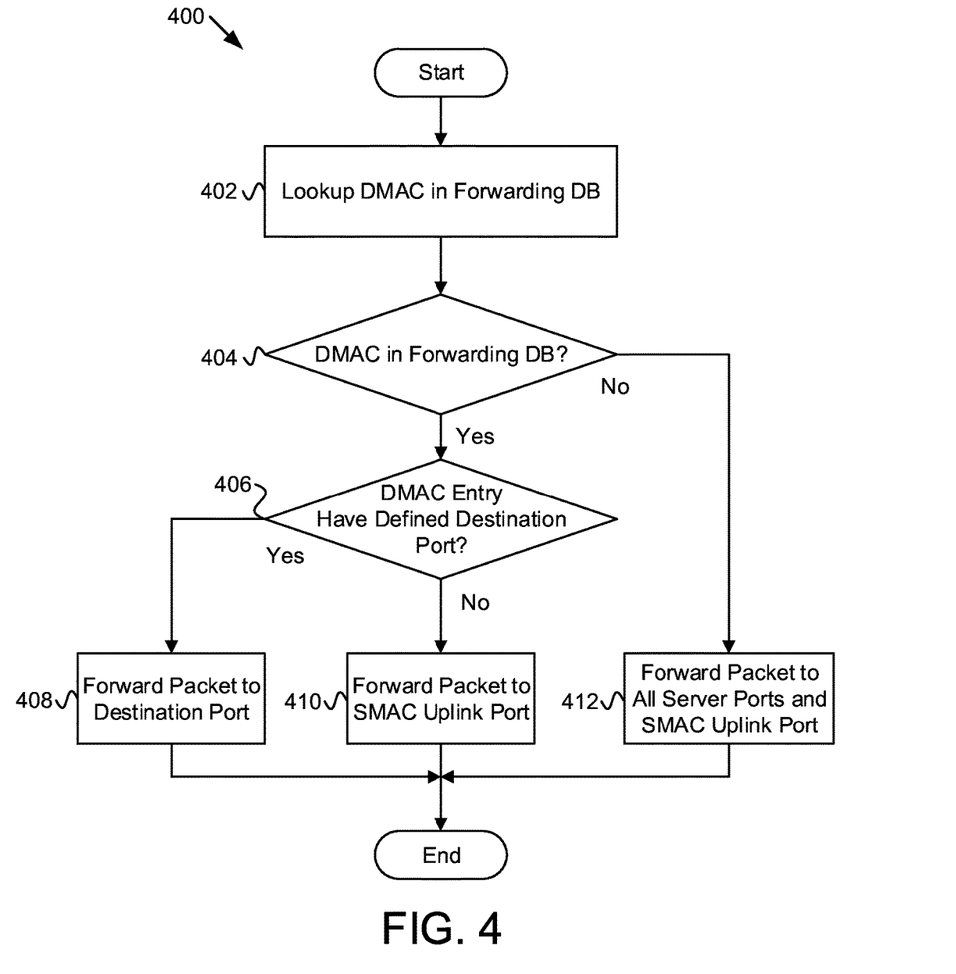
FIG. 4 is a schematic flow chart diagram illustrating one embodiment of a method for emulating end-host mode forwarding behavior.

FIG. 4 is a schematic flow chart diagram illustrating one embodiment of a method 400 for emulating end-host mode forwarding behavior. In particular, FIG. 4 illustrates forwarding a received data packet to a destination address from a network switch 112*a-n* emulating end-host mode using the entries in the forwarding database described in FIGS. 3A and 3B. In one embodiment, the method 400 begins and checks 402 an entry in the forwarding database for the destination address, e.g., the destination MAC address ("DMAC"). In various embodiments, if the method 400 determines 404 that the forwarding database includes an entry that corresponds to the DMAC, the method 400 further determines 406 whether the entry in the forwarding database that corresponds to the destination address has a defined destination port (e.g., the server port element of the entry is not DPORT-NULL).

In one embodiment, if the method 400 determines 406 that the DMAC entry has a defined destination port, the method 400 forwards 408 the packet to the defined destination port, and the method 400 ends. In some embodiments, before forwarding 408 the packet to the defined destination port, the method 400 performs an RPF check if the ingress port, e.g., the port that the data packet was received on, is an uplink port to confirm that the data packet was received on an expected uplink port for the particular destination address.

In one embodiment, if the method 400 determines 406 that the entry in the forwarding database for the DMAC is not a defined port entry (e.g., the server port element of the entry is equal to DPORT-NULL), then the method 400 forwards 410 the packet to the uplink port associated with the source address (the SMAC) of the data packet in the forwarding database, and the method 400 ends. In some embodiments, if the uplink port for the SMAC is not defined (e.g., the uplink port element in the forwarding database is equal to DPORT-NULL), then the method 400 drops the data packet without forwarding it to the destination address, which ensures that data packets received on uplink ports are not forwarded back to the upstream data network 104 via an uplink port.

In one embodiment, if the method 400 determines 404 that the forwarding database does not include an entry corresponding to the DMAC of the data packet, the method 400 forwards 412 the data packet to all server ports and/or one or more uplink ports associated with the SMAC of the data packet, and the method 400 ends. For example, if the method 400 receives a unicast packet for which no entry in the forwarding database corresponds to the destination address of the unicast packet, the method 400 may forward 412 the data packet to all server ports and one or more uplink ports associated with the source address of the data packet, as determined by a lookup in the forwarding database for an entry corresponding to the source address, as described in FIGS. 3A and 3B. In such an embodiment, if the method 400 determines that the uplink port for the source address is undefined (e.g., the uplink port for the SMAC is equal to DPORT-NULL), the method 400 may only forward the data packet to all the server ports of the network switch 112a-n to ensure that a unicast packet that does not have an entry in the forwarding database that corresponds to the destination address of the unicast packet is not forwarded back to the upstream data network 104.

In a further embodiment, if a broadcast or multicast data packet is received at a broadcast port or multicast port, respectively, of the network switch 112a-n, the method 400 may forward 412 the broadcast or multicast packet to all server ports and one or more uplink ports associated with the source address of the broadcast or multicast data packet because the broadcast or multicast data packet may not include a specific destination address. In some embodiments, the transmission module 208 determines where to forward the data packet and forwards the data packet to the determined destination(s) as described above with reference to FIG. 4.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a data module that receives a data packet at an ingress port of a network switch, the data packet comprising a source address and a destination address, the network switch comprising one or more ports designated as uplink ports and one or more different ports designated as server ports;
an update module that, in response to a forwarding database of the network switch not comprising an entry that corresponds to the source address, creates an entry in the forwarding database based on the data packet, an entry comprising at least an address, a server port, and an uplink port, wherein the entry for the data packet comprises the source address and one of:
an undefined server port and an undefined uplink port in response to the ingress port being an uplink port, an undefined port comprising an identifier for a port that does not exist; and
the ingress port and one of the one or more uplink ports in response to the ingress port being a server port; and
a transmission module that forwards the data packet from the network switch to the destination address using one or more of a server port and an uplink port in response to checking the forwarding database for an entry that corresponds to the destination address.

2. The apparatus of claim 1, wherein the transmission module forwards the data packet from the network switch to the destination address using an uplink port associated with the source address in response to the forwarding database comprising an entry for the destination address that comprises an undefined server port.

3. The apparatus of claim 2, wherein the transmission module drops the data packet in response to the forwarding database comprising an entry for the destination address that comprises an undefined uplink port.

4. The apparatus of claim 1, wherein the transmission module forwards the data packet from the network switch to the destination address using a server port associated with the destination address in response to the forwarding database comprising an entry for the destination address that comprises a defined server port.

5. The apparatus of claim 4, wherein the transmission module performs a reverse path forwarding ("RPF") check in response to the ingress port being same as the uplink port associated with the destination address.

6. The apparatus of claim 1, wherein the transmission module forwards the data packet from the network switch using each server port and one or more defined uplink ports associated with the source address in response the forwarding database not comprising an entry for the destination address.

7. The apparatus of claim 1, further comprising a priority module that assigns each of the one or more designated server ports and each of the one or more designated uplink ports a priority value, wherein a server port has a higher priority value than an uplink port.

8. The apparatus of claim 7, wherein the priority module, in response to the forwarding database comprising an entry that corresponds to the source address, assigns the ingress port to the server port for the source address entry in response to determining the priority value of the ingress port is higher than the priority value of the server port for the source address in the forwarding database.

9. The apparatus of claim 8, wherein the priority module, in response to determining the priority value of the ingress port is not higher than the priority value of the server port for the source address in the forwarding database, assigns the ingress port to the server port for the source address entry in response to a priority override bit for the source address being equal to zero.

10. The apparatus of claim 9, wherein the priority module increments the priority override bit for a source address in the forwarding database each time a data packet is received from the source address.

11. The apparatus of claim 9, wherein the priority module decrements the priority override bit for a source address in the forwarding database in response to expiration of a priority override timer.

12. The apparatus of claim 1, wherein the network switch is one component of an integrated data infrastructure unit comprising one or more servers, one or more network switches, management software, and application software.

13. The apparatus of claim 1, wherein the data packet comprises one of a unicast packet, a broadcast packet, and a multicast packet.

14. A method comprising:
  receiving, by use of a processor, a data packet at an ingress port of a network switch, the data packet comprising a source address and a destination address, the network switch comprising one or more ports designated as uplink ports and one or more different ports designated as server ports;
  creating, in response to a forwarding database of the network switch not comprising an entry that corresponds to the source address, an entry in the forwarding database based on the data packet, an entry comprising at least an address, a server port, and an uplink port, wherein the entry for the data packet comprises the source address and one of:
    an undefined server port and an undefined uplink port in response to the ingress port being an uplink port, an undefined port comprising an identifier for a port that does not exist; and
    the ingress port and one of the one or more uplink ports in response to the ingress port being a server port; and
  forwarding the data packet from the network switch to the destination address using one or more of a server port and an uplink port in response to checking the forwarding database for an entry that corresponds to the destination address.

15. The method of claim 14, further comprising forwarding the data packet from the network switch to the destination address using an uplink port associated with the source address in response to the forwarding database comprising an entry for the destination address that comprises an undefined server port.

16. The method of claim 15, further comprising dropping the data packet in response to the forwarding database comprising an entry for the destination address that comprises an undefined uplink port.

17. The method of claim 14, further comprising forwarding the data packet from the network switch to the destination address using a server port associated with the destination address in response to the forwarding database comprising an entry for the destination address that comprises a defined server port.

18. The method of claim 17, further comprising performing a reverse path forwarding ("RPF") check in response to the ingress port being same as the uplink port associated with the destination address.

19. The method of claim 14, further comprising forwarding the data packet from the network switch using each server port and one or more defined uplink ports associated with the source address in response the forwarding database not comprising an entry for the destination address.

20. A program product comprising a non-transitory computer readable storage medium that stores code executable by a processor, the executable code comprising code to perform:
  receiving a data packet at an ingress port of a network switch, the data packet comprising a source address and a destination address, the network switch comprising one or more ports designated as uplink ports and one or more different ports designated as server ports;
  creating, in response to a forwarding database of the network switch not comprising an entry that corresponds to the source address, an entry in the forwarding database based on the data packet, an entry comprising at least an address, a server port, and an uplink port, wherein the entry for the data packet comprises the source address and one of:
    an undefined server port and an undefined uplink port in response to the ingress port being an uplink port, an undefined port comprising an identifier for a port that does not exist; and
    the ingress port and one of the one or more uplink ports in response to the ingress port being a server port; and
  forwarding the data packet from the network switch to the destination address using one or more of a server port and an uplink port in response to checking the forwarding database for an entry that corresponds to the destination address.

* * * * *